United States Patent
Markovic et al.

(10) Patent No.: US 9,722,645 B2
(45) Date of Patent: Aug. 1, 2017

(54) APPARATUS AND METHOD FOR GENERATING A TRANSMIT SIGNAL

(71) Applicant: Intel IP Corporation, Santa Clara, CA (US)

(72) Inventors: Jovan Markovic, Linz (AT); Jan Zaleski, Linz (AT); Christian Mayer, Linz (AT)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/858,133

(22) Filed: Sep. 18, 2015

(65) Prior Publication Data

US 2016/0182101 A1    Jun. 23, 2016

(30) Foreign Application Priority Data

Dec. 18, 2014  (DE) .......................... 10 2014 119 071

(51) Int. Cl.
*H04B 1/04* (2006.01)
*H04L 27/36* (2006.01)

(52) U.S. Cl.
CPC ......... *H04B 1/0475* (2013.01); *H04L 27/364* (2013.01)

(58) Field of Classification Search
CPC .. H04B 1/0475; H04L 27/364; H04L 27/2627
See application file for complete search history.

(56) References Cited

U.S. PATENT DOCUMENTS

| | | | | |
|---|---|---|---|---|
| 5,881,107 | A * | 3/1999 | Termerinac | H04L 27/2082 329/304 |
| 6,339,621 | B1 * | 1/2002 | Cojocaru | H04L 27/362 375/247 |
| 6,370,188 | B1 | 4/2002 | Wu et al. | |
| 8,295,388 | B1 * | 10/2012 | Hinton | H04L 27/365 375/219 |
| 8,477,857 | B2 * | 7/2013 | Osman | H04L 27/362 375/259 |
| 8,520,968 | B1 * | 8/2013 | Wyville | G06K 9/0051 382/191 |
| 8,908,803 | B2 | 12/2014 | McFarthing | |
| 8,976,898 | B1 * | 3/2015 | Wilson | H03F 1/3205 375/295 |

(Continued)

*Primary Examiner* — Sophia Vlahos
(74) *Attorney, Agent, or Firm* — Eschweiler & Potashnik, LLC

(57) ABSTRACT

An apparatus for generating a transmit signal includes an up-conversion module and a delay module. The up-conversion module up-converts a first component signal of a multi-phase baseband transmit signal using a first oscillator signal and up-converts a delayed second component signal of the multi-phase baseband transmit signal using a second oscillator signal to generate a radio frequency transmit signal. The first oscillator signal and the second oscillator signal comprise an oscillator signal phase offset so that an edge of the second oscillator signal occurs earlier than a corresponding edge of the first oscillator signal. The delay module delays a second component signal of the multi-phase baseband transmit signal relative to the first component signal of the multi-phase baseband transmit signal by a predefined component signal delay to generate the delayed second component signal of the multi-phase baseband transmit signal.

22 Claims, 7 Drawing Sheets

(56) References Cited

U.S. PATENT DOCUMENTS

| | | | | |
|---|---|---|---|---|
| 9,184,974 | B1* | 11/2015 | Baringer | H04L 27/206 |
| 2003/0045249 | A1* | 3/2003 | Nielsen | H03C 3/40 |
| | | | | 455/118 |
| 2004/0037366 | A1* | 2/2004 | Crawford | H04L 27/2649 |
| | | | | 375/295 |
| 2006/0031274 | A1* | 2/2006 | Haddadin | H03H 17/0275 |
| | | | | 708/300 |
| 2006/0233282 | A1* | 10/2006 | Ota | H04L 27/18 |
| | | | | 375/308 |
| 2009/0068964 | A1* | 3/2009 | Gregg | H04H 20/34 |
| | | | | 455/91 |
| 2009/0213960 | A1* | 8/2009 | Ikeda | H04L 27/362 |
| | | | | 375/296 |
| 2010/0302083 | A1* | 12/2010 | Helfenstein | H04L 25/49 |
| | | | | 341/118 |
| 2011/0129037 | A1* | 6/2011 | Staszewski | H03F 3/193 |
| | | | | 375/316 |
| 2012/0120992 | A1* | 5/2012 | Soltanian | H03L 7/099 |
| | | | | 375/221 |
| 2012/0200435 | A1* | 8/2012 | Ngo | H03M 7/3082 |
| | | | | 341/61 |
| 2012/0229208 | A1* | 9/2012 | Wimpenny | H03F 1/0227 |
| | | | | 330/127 |
| 2014/0269960 | A1* | 9/2014 | Petrov | H04L 27/3444 |
| | | | | 375/261 |
| 2014/0314178 | A1* | 10/2014 | Seo | H03M 3/30 |
| | | | | 375/296 |

* cited by examiner

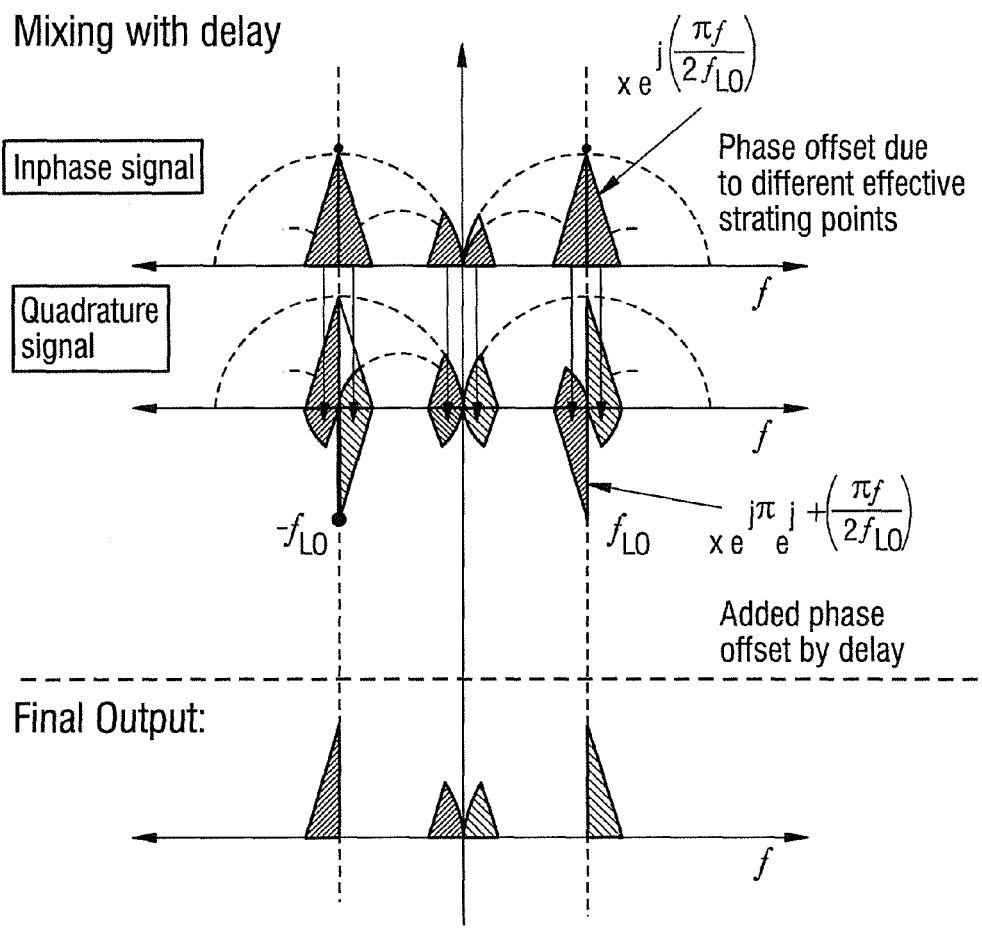

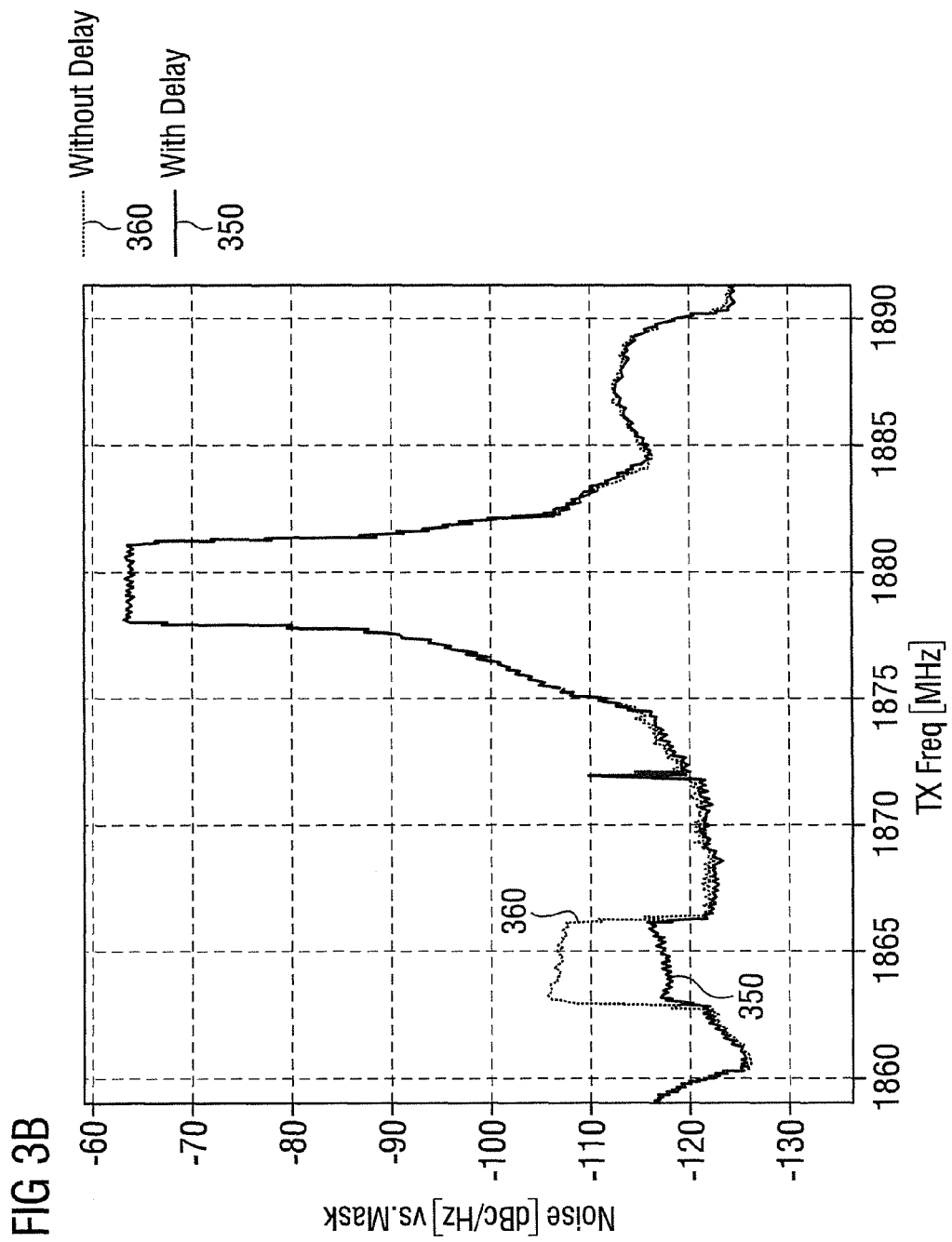

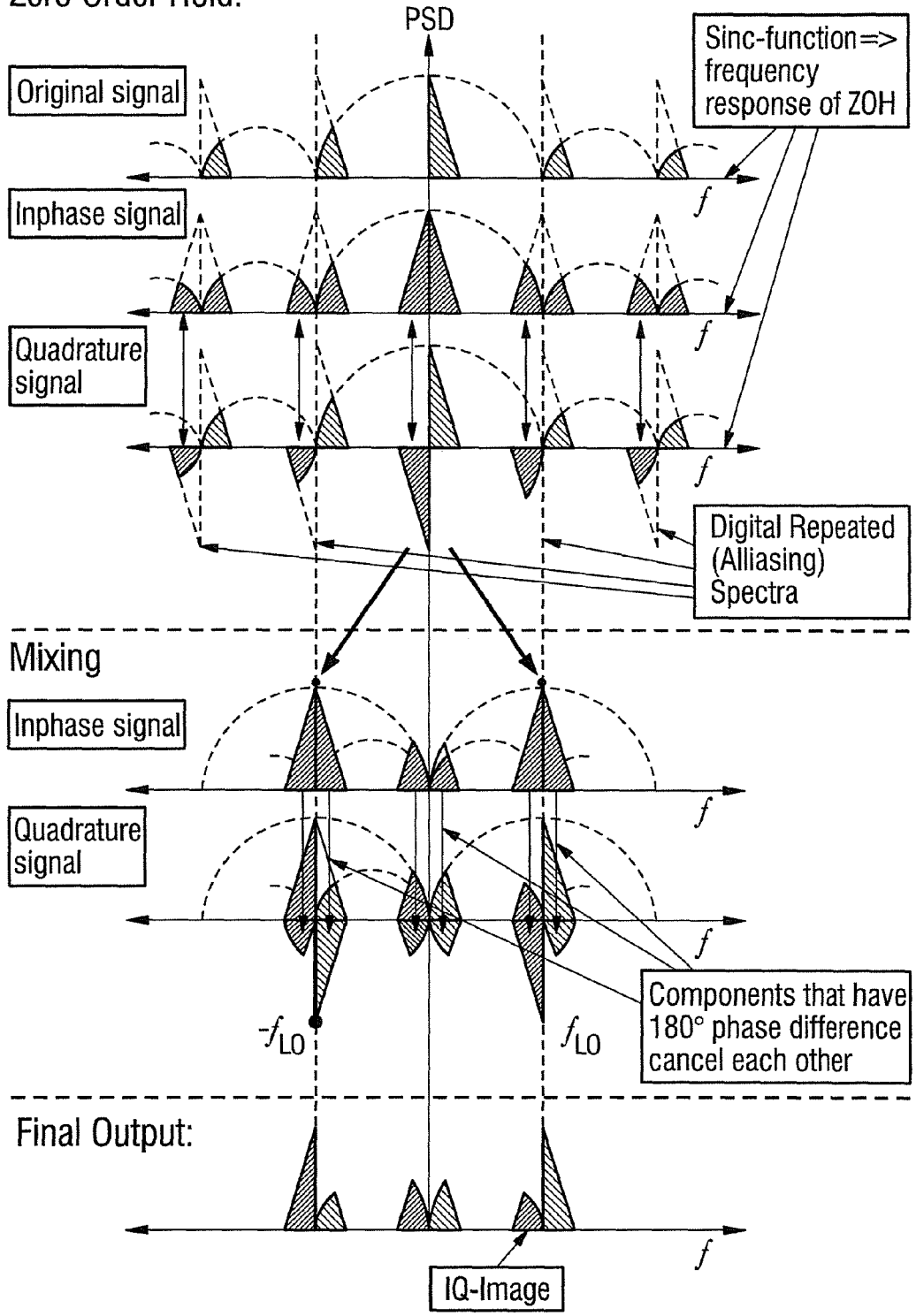

APPARATUS AND METHOD FOR GENERATING A TRANSMIT SIGNAL

REFERENCE TO RELATED APPLICATION

This application claims priority to German Application number 10 2014 119 071.8 filed on Dec. 18, 2014, the contents of which are incorporated by reference in their entirety.

FIELD

The present disclosure relates to radio frequency signal generation and in particular to an apparatus and a method for generating a transmit signal.

BACKGROUND

The demand on ever increasing amount of data to be transmitted in short time causes higher requirements with respect to the transmit signals. Therefore, it is desired to reduce disturbances and interference within the transmit signal to meet these higher requirements.

BRIEF DESCRIPTION OF THE DRAWINGS

Some examples of apparatuses and/or methods will be described in the following by way of example only, and with reference to the accompanying figures, in which

FIG. 3A shows a schematic illustrations of power spectral densities of an in-phase and a quadrature part of a signal during generation of a transmit signal by using a proposed signal delay;

FIG. 3B shows a diagram of Noise over frequency of a transmit signal with a proposed delay of one component signal relative to the other;

FIG. 7 shows schematic illustrations of power spectral densities of an in-phase and a quadrature part of a signal during generation of a transmit signal without signal delay.

DETAILED DESCRIPTION

Figure 1:
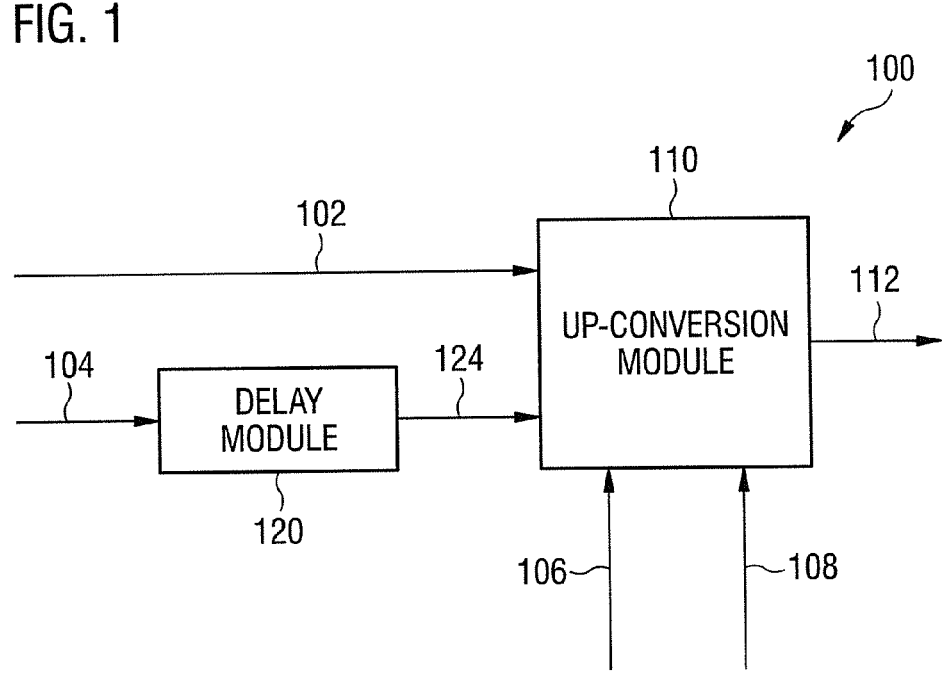
FIG. 1 shows a block diagram of an apparatus for generating a transmit signal.

Various examples will now be described more fully with reference to the accompanying drawings in which some examples are illustrated. In the figures, the thicknesses of lines, layers and/or regions may be exaggerated for clarity.

Accordingly, while examples are capable of various modifications and alternative forms, the illustrative examples in the figures and will herein be described in detail. It should be understood, however, that there is no intent to limit examples to the particular forms disclosed, but on the contrary, examples are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing illustrative examples only and is not intended to be limiting. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or component signals, but do not preclude the presence or addition of one or more other features, integers, steps, operations, elements, component signals and/or groups thereof.

Unless otherwise defined, all terms (including technical and scientific terms) used herein have the same meaning as commonly understood by one of ordinary skill in the art to which examples belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

In the following, various examples relate to devices (e.g. cell phone, base station) or component signals (e.g. transmitter, transceiver) of devices used in wireless or mobile communications systems. A mobile communication system may, for example, correspond to one of the mobile communication systems standardized by the 3rd Generation Partnership Project (3GPP), e.g. Global System for Mobile Communications (GSM), Enhanced Data rates for GSM Evolution (EDGE), GSM EDGE Radio Access Network (GERAN), High Speed Packet Access (HSPA), Universal Terrestrial Radio Access Network (UTRAN) or Evolved UTRAN (E-UTRAN), Long Term Evolution (LTE) or LTE-Advanced (LTE-A), or mobile communication systems with different standards, e.g. Worldwide Interoperability for Microwave Access (WIMAX) IEEE 802.16 or Wireless Local Area Network (WLAN) IEEE 802.11, generally any system based on Time Division Multiple Access (TDMA), Frequency Division Multiple Access (FDMA), Orthogonal Frequency Division Multiple Access (OFDMA), Code Division Multiple Access (CDMA), etc. The terms mobile communication system and mobile communication network may be used synonymously.

The mobile communication system may comprise a plurality of transmission points or base station transceivers operable to communicate radio signals with a mobile transceiver. In these examples, the mobile communication system may comprise mobile transceivers, relay station transceivers and base station transceivers. The relay station transceivers and base station transceivers can be composed of one or more central units and one or more remote units.

A mobile transceiver or mobile device may correspond to a smartphone, a cell phone, User Equipment (UE), a laptop, a notebook, a personal computer, a Personal Digital Assistant (PDA), a Universal Serial Bus (USB)-stick, a tablet computer, a car, etc. A mobile transceiver or terminal may also be referred to as UE or user in line with the 3GPP terminology. A base station transceiver can be located in the fixed or stationary part of the network or system. A base station transceiver may correspond to a remote radio head, a transmission point, an access point, a macro cell, a small cell, a micro cell, a pico cell, a femto cell, a metro cell etc. The term small cell may refer to any cell smaller than a macro cell, i.e. a micro cell, a pico cell, a femto cell, or a metro cell. Moreover, a femto cell is considered smaller than a pico cell, which is considered smaller than a micro cell. A base station transceiver can be a wireless interface of a wired network, which enables transmission and reception of radio signals to a UE, mobile transceiver or relay transceiver. Such a radio signal may comply with radio signals as, for example, standardized by 3GPP or, generally, in line with one or more of the above listed systems. Thus, a base station transceiver may correspond to a NodeB, an eNodeB, a BTS, an access point, etc. A relay station transceiver may correspond to an intermediate network node in the communication path between a base station transceiver and a mobile station transceiver. A relay station transceiver may forward a signal received from a mobile transceiver to a base station transceiver, signals received from the base station transceiver to the mobile station transceiver, respectively.

The mobile communication system may be cellular. The term cell refers to a coverage area of radio services provided by a transmission point, a remote unit, a remote head, a remote radio head, a base station transceiver, relay transceiver or a NodeB, an eNodeB, respectively. The terms cell and base station transceiver may be used synonymously. In some examples a cell may correspond to a sector. For example, sectors can be achieved using sector antennas, which provide a characteristic for covering an angular section around a base station transceiver or remote unit. In some examples, a base station transceiver or remote unit may, for example, operate three or six cells covering sectors of 120° (in case of three cells), 60° (in case of six cells) respectively. Likewise a relay transceiver may establish one or more cells in its coverage area. A mobile transceiver can be registered or associated with at least one cell, i.e. it can be associated to a cell such that data can be exchanged between the network and the mobile in the coverage area of the associated cell using a dedicated channel, link or connection. A mobile transceiver may hence register or be associated with a relay station or base station transceiver directly or indirectly, where an indirect registration or association may be through one or more relay transceivers.

FIG. 1 shows a block diagram of an apparatus for generating a transmit signal according to an example. The apparatus 100 comprises an up-conversion module 110 and a delay module 120. The up-conversion module 110 up-converts a first component signal 102 of a multi-phase baseband transmit signal using a first oscillator signal 106 and up-converts a delayed second component signal 124 of the multi-phase baseband transmit signal using a second oscillator signal 108 to generate a radio frequency transmit signal 112. The first oscillator signal 106 and the second oscillator signal 108 comprise an oscillator signal phase offset so that an edge of the second oscillator signal 108 occurs earlier than a corresponding edge of the first oscillator signal 106. The delay module 120 delays a second component signal 104 of the multi-phase baseband transmit signal relative to the first component signal 102 of the multi-phase baseband transmit signal by a predefined component signal delay to generate the delayed second component signal 124 of the multi-phase baseband transmit signal.

The edges of symbol intervals within the first and the second component signal may be adapted to the oscillator signal phase offset by using a proposed delay module. Therefore, disturbing signal portions within the transmit band may be reduced. In this way, the EVM (error vector magnitude) may be improved and/or spectral demands may be met easier.

In the following, the multi-phase baseband transmit signal may be a complex valued baseband transmit signal (e.g. I and Q signal), although the multi-phase baseband transmit signal 102 may comprise also more than two components (e.g. three or more component signals). The complex valued baseband transmit signal may contain information to be sent to an external receiver and may be provided by a baseband processor, for example. The data to be sent may be represented by symbols (e.g. complex values, in-phase-quadrature values, quadrature amplitude modulation QAM values) to be transmitted during succeeding symbol intervals. The complex valued baseband transmit signal may contain a sequence of succeeding symbols to be transmitted at succeeding symbol time intervals. The complex valued baseband transmit signal may comprise a frequency bandwidth located in the baseband domain of the apparatus 100 (e.g. less than 100 MHz or less than 500 MHz, for example, 0 to 30 MHz). The complex valued baseband transmit signal 102 may comprise two components (e.g. in-phase and quadrature). The first component signal 102 of the complex valued baseband transmit signal may be an in-phase signal and the second component signal 104 of the complex valued baseband transmit signal may be a quadrature signal or vice versa. The first component signal 102 of the complex valued baseband transmit signal, the second component signal 104 of the complex valued baseband transmit signal and the delayed second component signal 124 of the complex valued baseband transmit signal may be digital signals.

The up-conversion module 110 may perform at least an up-conversion (e.g. and optionally amplifying and filtering) of the first component signal 102 of the complex valued baseband transmit signal and the delayed second component signal 124 of the complex valued baseband transmit signal from the baseband domain to a radio frequency domain of the apparatus 100 (e.g. mixing the component signals with an oscillator signal by a one or more mixers or by sampling the component signals by a radio frequency analog-to-digital converter) in order to generate the radio frequency transmit signal 112 (e.g. to be sent to an external receiver). For example, the frequency range of the complex valued baseband transmit signal may be shifted by an oscillator signal frequency of the first and the second oscillator signal.

The first radio frequency transmit signal 112 may comprise signal portions within one or more frequency bands (e.g. located between 500 MHz and 10 GHz). The radio frequency transmit signal 112 may be provided to a power amplifier of a transmitter or transceiver, for example. The first radio frequency transmit signal 112 may be an analog signal.

The first oscillator signal 106 and the second oscillator signal 108 may comprise the same oscillator signal frequency (e.g. located between 500 MHz and 10 GHz) depending on a currently used transmit channel. The first oscillator signal 106 and the second oscillator signal 108 may be a square wave signal (or a sinusoidal signal). The first oscillator signal 106 and the second oscillator signal 108 comprise a constant oscillator signal phase offset. For example, the second oscillator signal 108 may be generated by an oscillator module and the first oscillator signal 106 may be generated by a constant delay of the second oscillator signal 108 causing the oscillator signal phase offset. An edge (e.g. rising or falling edge) of the second oscillator signal 108 occurs earlier than a corresponding edge of the first oscillator signal 106 due to the oscillator signal phase offset. In other words, a maximum of a period of the second oscillator signal 108 occurs earlier than a maximum of the corresponding period of the first oscillator signal 106, for example. The oscillator signal phase offset may be substantially equal to 90° (e.g. depending on the accuracy of the oscillator signal generation, for example, between 85° and 95°).

The delay module 120 causes a delay (e.g. analog or digital, sample or sub-sample) of the second component signal 104 of the complex valued baseband transmit signal relative to the first component signal 102 of the complex valued baseband transmit signal. In other words, the delay module 120 generates a delayed second component signal 124 of the complex valued baseband transmit signal, which is delayed relative to the first component signal 102 of the complex valued baseband transmit signal. For example, a symbol interval of the delayed second component signal 124 of the complex valued baseband transmit signal may start later than a corresponding symbol interval of the first component signal 102 of the complex valued baseband transmit signal. The delay module 120 may delay all component signals except for one component signal (e.g. the first component signal) relative to the one component signal (e.g. first component signal), if the multi-phase baseband transmit signal comprises more the two component signals, for example. For example, a higher are better power efficiency and ease of using a digital controlled oscillator (DCO) may be obtained at 3×LO (local oscillator) frequency instead of 2×/4× etc.

For example, the predefined component signal delay is less than a period (e.g. between 10% and 50% of the period, between 20% and 40% of the period or between 23% and 27% of the period) of the first oscillator signal 106. For example, the predefined component signal delay is substantially equal to 25% of a period of the first oscillator signal. In other words, the delay module 120 may cause a delay corresponding to the oscillator signal phase offset of the oscillator signals, if the first oscillator signal 106 and the second oscillator signal 108 comprise equal frequencies and an oscillator signal phase offset of 90°. For example, the first oscillator signal 106 may comprise a rising edge at a position within a symbol interval of the first component signal 102 of the complex valued baseband transmit signal substantially equal to a position of a corresponding rising edge of the second oscillator signal 108 within a corresponding symbol interval of the delayed second component signal 124 of the complex valued baseband transmit signal due to the predefined component signal delay.

For example, the symbol rate may be much smaller than the local oscillator LO rate, eg. 30.72 MHz symbol rate vs 1960 MHz LO rate. It may be upsampled (e.g. interpolate to LO rate). Without a delay, I and Q are sampled at different times at LO rate, VS may be assumed concurrency in baseband signal, for example. This may be compensated somewhere between baseband signal and LO rate sampling, for example.

For example, the predefined component signal delay may be constant during the whole operation of a transmitter or transceiver using the apparatus 100. Alternatively, the predefined component signal delay may be adapted to different transmit conditions. For example, the transmitter or transceiver may use the same transmit path for transmitting signals at different transmit channels (different carrier frequencies, different oscillator signal frequencies) at different times. In this example, the delay module 120 may be configured to delay the second component signal 104 of the complex valued baseband transmit signal relative to the first component signal 102 of the complex valued baseband transmit signal by different predefined component signal delays for different oscillator signal frequencies of the second oscillator signal 108 and/or the first oscillator signal 106. In other words, the delay module 120 may be configured to delay the second component signal 104 of the complex valued baseband transmit signal relative to the first component signal 102 of the complex valued baseband transmit signal by a first predefined component signal delay during a first transmit time interval (e.g. using the first and second oscillator signal with a first oscillator signal frequency) and delay the second component signal 104 of the complex valued baseband transmit signal relative to the first component signal 102 of the complex valued baseband transmit signal by a second predefined component signal delay (different from the first predefined component signal delay) during a succeeding second transmit time interval (e.g. using the first and second oscillator signal with a second oscillator signal frequency). For example, the delay module 120 may comprise an adjustable delay element and a memory module storing different delay element control values for different oscillator frequencies of the first and second oscillator signal. In this example, the memory module may provide one or more delay element control signals or values to the delay element to adjust the component signal delay to a predefined value based on the currently used oscillator frequency of the first and second oscillator signal.

The delay module 120 may be implanted in various ways. For example, the delay module 120 may comprise or may be a filter circuit configured to delay the second component signal of the complex valued baseband transmit signal by the predefined component signal delay. The filter circuit may be an all-pass filter circuit. For example, filter circuit may be an IIR filter (Infinite Impulse Response filter) providing a very accurate delay control but high power consumption or an FIR filter (Finite Impulse Response filter) providing lower accuracy of delay control but also lower power consumption.

Alternatively, the apparatus 100 may comprise a fractional sample rate converter module comprising the delay module 120. The fractional sample rate converter module may be configured to convert a sample rate (e.g. by oversampling) of the second component signal 104 of the complex valued baseband transmit signal and delay the second component signal 104 of the complex valued baseband transmit signal by the predefined component signal delay to generate the delayed second component signal 124 of the complex valued baseband transmit signal. The implementation of the functionality of the delay module 120 within a fractional sample rate converter may keep the hardware effort and/or additional current consumption low, since many transmitters or transceiver comprise fractional sample rate converters anyway.

Alternatively, the apparatus 100 may comprise a Fourier Transformation module (e.g. implementing a Fast Fourier Transformation or another Fourier Transformation) comprising the delay module 120. The delay module 120 may be configured to generate a phase shift of the second component signal 104 in the frequency domain to generate the predefined component signal delay of the delayed second component signal 124 of the complex valued baseband transmit signal. The implementation of the functionality of the delay module 120 within a Fourier Transformation module may keep the hardware effort and/or additional current consumption low, since many transmitters or transceivers (e.g. OFDM transmitter or OFDM transceiver) comprise Fourier Transformation modules anyway.

Additionally, the apparatus 100 may comprise an optional baseband processor module configured to provide the first component signal 102 of the complex valued baseband transmit signal and the second component signal 104 of the complex valued baseband transmit signal. Alternatively, the baseband processor module may already provide the delayed second component signal 124 of the complex valued baseband transmit signal. For example, the baseband processor module may comprise a Fourier Transformation module for generating the delayed second component signal 124 of the complex valued baseband transmit signal.

The up-conversion module 110 may comprise a first digital to analog converter configured to convert the first component signal 102 of the complex valued baseband transmit signal to a first component signal of a complex valued radio frequency transmit signal with a sampling frequency equal to a frequency of the first oscillator signal 106. Further, the up-conversion module 110 may comprise a second digital to analog converter configured to convert the delayed second component signal 124 of the complex valued baseband transmit signal to a second component signal of the complex valued radio frequency transmit signal with a sampling frequency equal to a frequency of the second oscillator signal 108. For example, the first digital to analog converter and the second digital to analog converter may be zero-order-hold digital to analog converters.

For example, the digital to analog converter converts a digital (discrete valued) signal into an analog (continues) signal. After ZOH (zero-order-hold digital to analog converter) and a mixer, the signal is real valued, for example. Also both I and Q components are real valued. They numerically represent real and imaginary part of a complex signal. For example, first an oversampling stage generates an oversampled (complex) baseband signal with the sampling frequency equal to a frequency of the first oscillator signal and then a ZOH converts digital to analog, but both signals are real valued.

Further, the up-conversion module 110 may combine the first component signal of the complex valued radio frequency transmit signal and the second component signal of the complex valued radio frequency transmit signal to generate the radio frequency transmit signal 112.

Additionally, the apparatus 100 may comprise an optional oscillator module configured to generate the first oscillator signal and the second oscillator signal. The oscillator module may comprise a PLL (phase locked loop) and/or a VCO (voltage controlled oscillator) or DCO (digitally controlled oscillator) for generating the first oscillator signal and/or the second oscillator signal. For example, the oscillator module may generate the first oscillator signal by delaying the second oscillator signal by substantially 25% of the period of the second oscillator signal. For example, the oscillator module may generate the first oscillator signal and the second oscillator signal with a constant common frequency during the whole operation of a transmitter or transceiver using the apparatus 100. Alternatively, the oscillator module may generate the first oscillator signal and the second oscillator signal with a first oscillator signal frequency during a first transmission time interval and may generate the first oscillator signal and the second oscillator signal with a second oscillator signal frequency during a succeeding second transmission time interval. The first oscillator signal frequency may differ from the second oscillator signal frequency. In this way, the oscillator module may enable a transmission through different transmit channels at different times.

Optionally, the up-conversion module 110 and the delay module 120 may be implemented on a common semiconductor die. Further, one or more further optional components or modules mentioned above or below (e.g. oscillator module, baseband processor module and/or power amplifier) may be implemented with the up-conversion module 110 and the delay module 120 on a common semiconductor die.

The up-conversion module 110 and the delay module 120 may be independent hardware units or part of a base band processor, a digital signal processor, a transmitter, a transceiver or a microcontroller or a computer program or a software product for running on a base band processor, a digital signal processor or a microcontroller, for example. The up-conversion module 110 and the delay module 120 may be implemented independently from each other or may be realized at least partly together.

Figure 2:
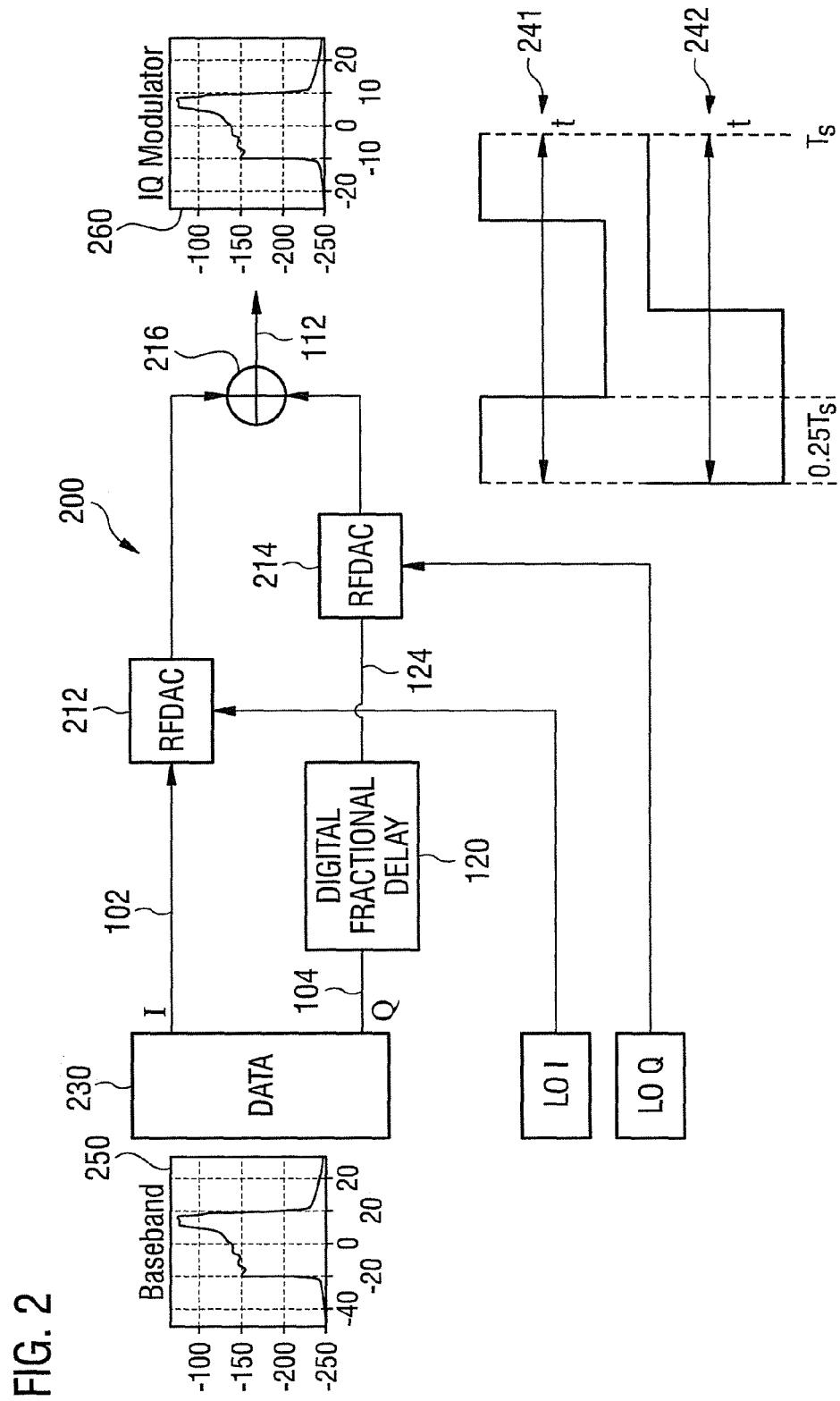
FIG. 2 shows a block diagram of an apparatus for generating a transmit signal with a delay module coupled to a radio frequency analog-to-digital converter.

FIG. 2 shows a block diagram of an apparatus for generating a transmit signal according to an example. The apparatus 200 comprises a baseband processor module 230 configured to provide an in-phase signal I 102 and a quadrature signal Q 104 containing data to be transmitted. The in-phase signal 102 is provided to a first radio frequency digital to analog converter RFDAC 212 (part of an up-conversion module) and the quadrature signal 104 is provided to a delay module 120 (e.g. causing a digital fractional delay). The delay module 120 delays the quadrature signal 104 by substantially 25% of the period of the oscillator signals and provides the delayed quadrature signal 124 to a second radio frequency digital to analog converter RFDAC 214 (part of an up-conversion module). The first radio frequency digital to analog converter RFDAC 212 up-converts the in-phase signal 102 to generate an in-phase radio frequency transmit signal based on the first oscillator signal LO I. Further, the second radio frequency digital to analog converter RFDAC 214 up-converts the delayed quadrature signal 124 to generate a quadrature radio frequency transmit signal based on the second oscillator signal LO Q. Further, the apparatus 200 comprises a combiner or combining node 216 combining the in-phase radio frequency transmit signal and the quadrature radio frequency transmit signal to obtain a radio frequency transmit signal 112. The radio frequency transmit signal 112 may be provided to a power amplifier, an antenna switch, an antenna matching network and/or an antenna module, for example.

Additionally, FIG. 2 shows a schematic illustration 241 of the first oscillator signal LO I and a schematic illustration 242 of the second oscillator signal LO Q. In order to achieve modulation, I and Q signals in RFDAC IQ mode may be multiplied with LO signals (local oscillator) that have 90° phase difference. Since rectangular signals may be used, 90° phase difference may be achieved by shifting one of the LO signals for a quarter of LO time period, for example.

Further, FIG. 2 shows a schematic illustration 250 of a simulation of the Noise [dBc/Hz] of the baseband and a schematic illustration 260 of a simulation of the Noise [dBc/Hz] of the radio frequency band after IQ modulation.

For example, an (IQ) Image may be suppressed when both components are aligned, i.e. when they start at same time point. Since delay in I is systematically introduced (due to 90° phase difference between LOs) in order to align components Q branch may be delayed by ¼ LO period, for example. For example, the branch that starts first may be delayed.

To avoid a systematic error both components may be aligned. Since Q starts a quarter period before I, signals in Q branch may be delayed for quarter of LO period by using digital signal processing techniques (e.g. digital filter). This may mean that the Q signal may still be digital, but values may correspond to the values of delayed signals.

The delay may also add a phase shift to (in this case) Q branch. I and Q aliasing spectral components that contribute to IQ—image may have in that case phase difference equal to π so they cancel each other, for example. A schematic illustration is represented by FIG. 3a.

As represented in FIG. 3a, IQ image may be suppressed by delaying one branch. These results can be confirmed in practical measurements.

Further, FIG. 3b shows an example for experimental verification of a transmit signal in a transmit TX frequency range between 1860 MHz and 1890 MHz with and without delay. Delay was introduced into the stimuli signal, using FFT-based Digital Fractional Delay approach, for example. In other words, the diagram of FIG. 3b shows a Noise [dBc/Hz] over frequency of a transmit signal with a proposed delay of one component signal relative to the other 350 and without delay 360. In this example, the IQ image around 1865 MHz is significantly reduced.

More details and aspects of the apparatus 200 are mentioned in connection with the proposed concept or one or more examples described above or below (e.g. FIG. 1). The apparatus 200 may comprise one or more additional optional features corresponding to one or more aspects of the proposed concept or one or more examples described above or below.

A low complex way to add fractional delay may be to use (e.g. allpass) filter on higher frequencies as presented in FIG. 2, for example.

Alternatively, it may be possible to implement delay in a fractional sample rate converter (FSRC). FSRCs may be used in both branches (in-phase branch and quadrature branch) for oversampling. In this example, one FSRC may produce an oversampled signal (delayed in-phase or quadrature signal) with fractional delay included.

Further alternatively, another possibility to add delay may be to multiply a Fourier transformed signal in OFDM signal generation (Orthogonal Frequency-Division Multiplexing) with a phase shift in the baseband domain (before inverse Fourier transformation is applied).

Figure 4:
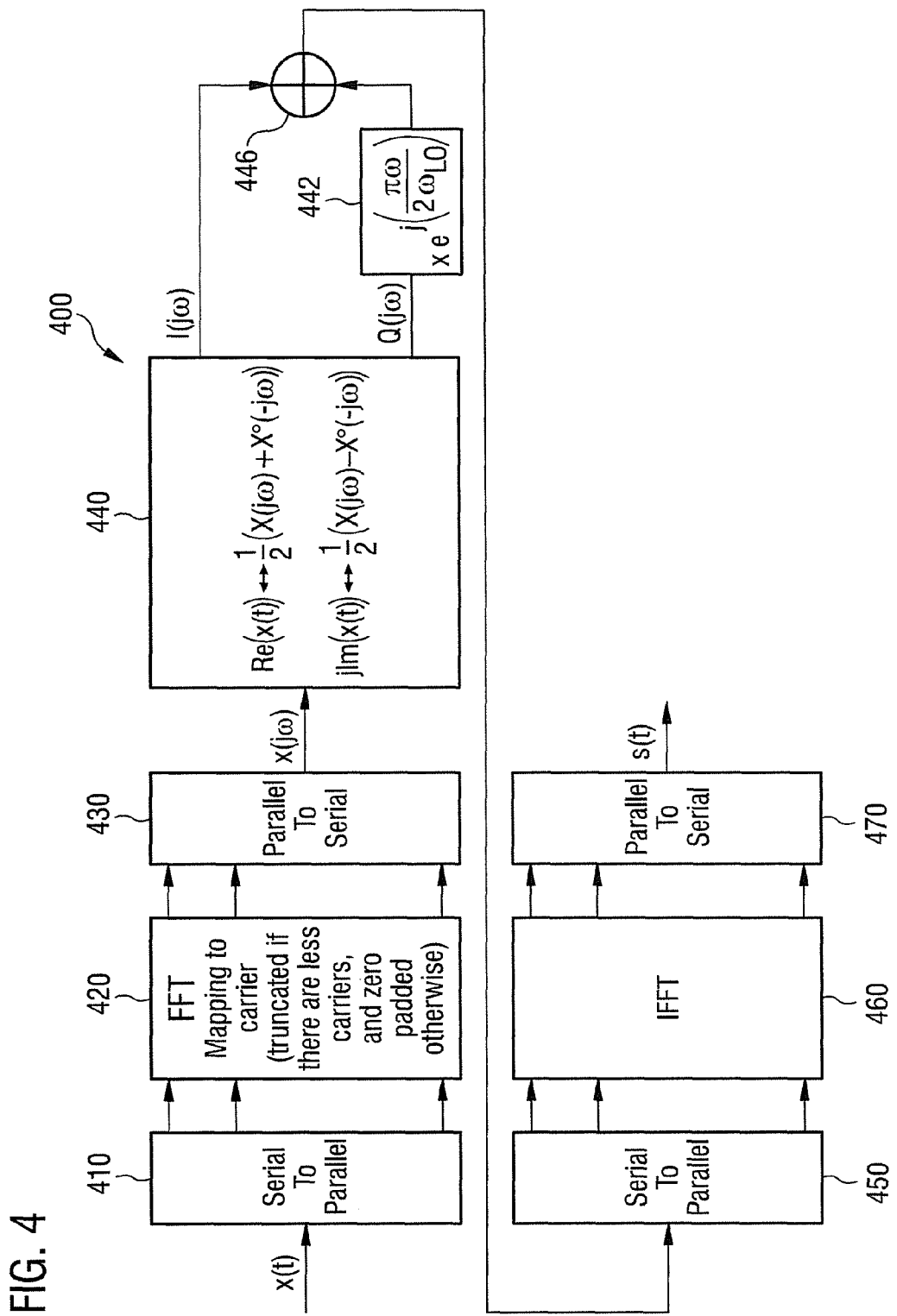
FIG. 4 shows a schematic illustration of a delay module implemented in a fast-Fourier-transformation module.

An example for an implementation of the delay module within a Fast Fourier Transformation module 400 is shown in FIG. 4. The Fast Fourier Transformation module 400 comprises a first serial-to-parallel converter 410 converting a serial baseband input signal x(t) to a plurality of parallel baseband input signals. Further, the Fast Fourier Transformation module 400 comprises a Fast Fourier transformation FFT determiner 420 configured to generate a plurality of parallel frequency domain signals by mapping the plurality of parallel baseband input signals to carriers (e.g. truncated if there are less carriers and zero padded otherwise). Additionally, the Fast Fourier Transformation module 400 comprises a first parallel-to-serial converter 430 converting the plurality of parallel frequency domain signals to a serial frequency domain signal X(jω). Further, the Fast Fourier Transformation module 400 comprises an in-phase-quadrature determiner configure to generate an in-phase frequency domain signal I(jω) and a quadrature frequency domain signal Q(jω) based on the serial frequency domain signal X(jω). Additionally, the Fast Fourier Transformation module 400 comprises a delay module 442 configured to delay the quadrature frequency domain signal Q(jω) to generate a delayed quadrature frequency domain signal. Further, the Fast Fourier Transformation module 400 comprises a combiner module 446 or combiner node configured to combine the in-phase frequency domain signal I(jω) and the delayed quadrature frequency domain signal to generate a combined frequency domain signal. Additionally, the Fast Fourier Transformation module 400 comprises a second serial-to-parallel converter 450 converting the combined frequency domain signal to a plurality of parallel combined frequency domain signals. Further, the Fast Fourier Transformation module 400 comprises an inverse Fast Fourier transformation IFFT determiner 460 configured to generate a plurality of parallel time domain output signals based on the plurality of parallel combined frequency domain signals. Additionally, the Fast Fourier Transformation module 400 comprises a second parallel-to-serial converter 470 converting the plurality of parallel time domain output signals to a serial time domain output signal. One or more modules of the Fast Fourier Transformation module 400 may be implemented by a computer program running on a baseband processor or may be implemented by hardware being part of a baseband processor or a transmitter or transceiver.

In order to describe how fractional delay can be introduced in frequency domain during OFDM signal generation, I and Q signals after ZOH (zero order hold) may be considered. When observed in frequency domain ZOH is equivalent to multiplication with Fourier transform of rectangular function:

$$I_{zoh} = I(f)FT\left(rect\left(t - \frac{3T_{LO}}{4}\right)\right)$$

$$Q_{zoh} = Q(f)FT\left(rect\left(t - \frac{T_{LO}}{2}\right)\right)$$

$$I_{zoh} = I(f)T_{LO}\frac{\sin\left(\frac{2\pi f T_{LO}}{2}\right)}{\frac{2\pi f T_{LO}}{2}}e^{j\frac{3T_{LO}2\pi f}{4}}$$

$$Q_{zoh} = Q(f)T_{LO}\frac{\sin\left(\frac{2\pi f T_{LO}}{2}\right)}{\frac{2\pi f T_{LO}}{2}}e^{j\frac{T_{LO}2\pi f}{2}}$$

Since an IQ image may rise on the frequencies that are opposite of the fundamental frequency $f_0$, the phase offset between I and Q signal on $-f_0$ may be of interest. Because the I and Q are imaginary and quadrature part of a signal, it may be concluded that they are In-phase on fundamental frequency $f_0$ and antiphase at $-f_0$, e.g.:

$$I_{zoh} = A(f)e^{j\frac{3T_{LO}2\pi f}{4}}$$

$$Q_{zoh} = A(f)e^{j\pi}e^{j\frac{T_{LO}2\pi f}{2}}$$

A(f) may be the amplitude part and $T_{LO}$ may be the period of the local oscillator signal. The phase difference may be:

$$\Delta = \frac{3\pi f_0}{2f_{LO}} - \pi - \frac{\pi f_0}{f_{LO}} = \frac{\pi f_0}{2f_{LO}} - \pi$$

For example, a phase correction of $(\pi f_0)/(2f_{LO})$ may be introduced in order to conserve antiphase characteristic. This may hold also when the signal contains more than one frequency. In that case, a phase correction may be a ramp function $\pi f/(2f_{LO})$ that depends on a fundamental frequency of a signal.

The delay may be calculated using following equation:

$$\tau_{del} = \frac{1}{2\pi}\frac{d\phi}{df} = \frac{1}{2\pi}\frac{\pi}{2f_{LO}} = \frac{1}{4f_{LO}} = \frac{1}{4}T_{LO}$$

I and Q part in frequency domain, e.g. before IFFT (inverse Fast Fourier transformation) in OFDM signal generation, can be calculated by using Fourier transformation identity:

$I(t)=Re\{x(t)\} \leftrightarrow \frac{1}{2}(X(j\omega)+X^*(-j\omega))=I(f)$ $jQ(t)=jIm\{x(t)\} \leftrightarrow \frac{1}{2}(X(j\omega)-X^*(-j\omega))=jQ(f)$ x(t) denotes a complex signal in time domain, $X(j\omega)$ a Fourier transformation of x(t), and $X^*(j\omega)$ denotes a conjugated complex of $X(j\omega)$, for example.

More details and aspects of an apparatus comprising a Fast Fourier Transformation module 400 are mentioned in connection with the proposed concept or one or more examples described above or below (e.g. FIG. 1). The apparatus and/or the Fast Fourier Transformation module 400 may comprise one or more additional optional features corresponding to one or more aspects of the proposed concept or one or more examples described above or below.

Figure 5:
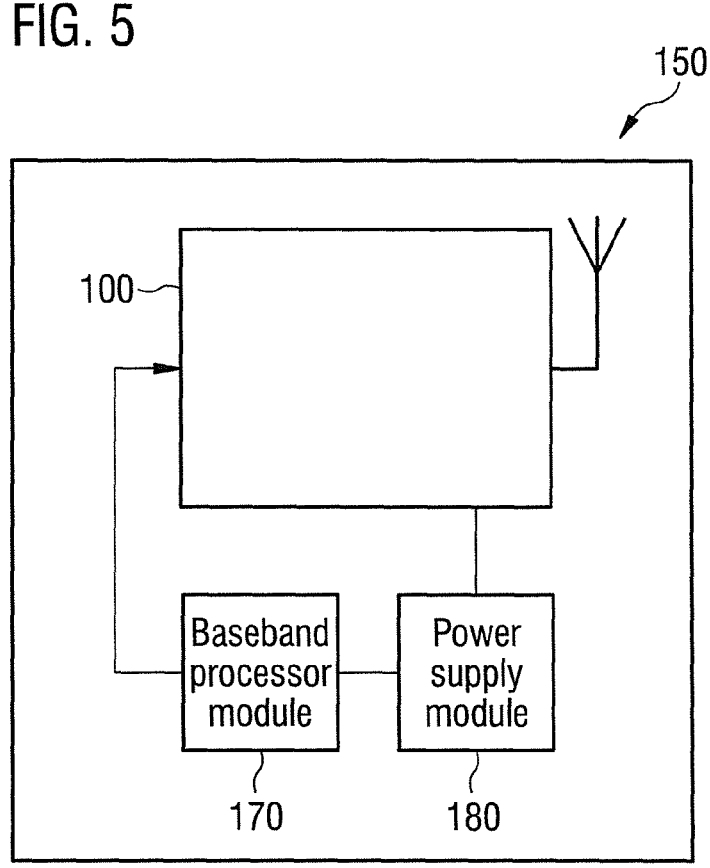
FIG. 5 shows a block diagram of a mobile device.

FIG. 5 shows a schematic illustration of a mobile device 150. The mobile device 150 comprises an apparatus 100 (e.g. FIG. 1-4) for generating a transmit signal within a transmitter or a transceiver. Further, the mobile device 150 comprises a baseband processor module 170 generating at least the baseband signal to be transmitted and/or processing a baseband receive signal. Additionally, the mobile device 150 comprises a power supply unit 180 supplying at least the transmitter or the transceiver and the baseband processor module 170 with power.

More details and aspects of an apparatus for generating a transmit signal within a transmitter or a transceiver are mentioned in connection with the proposed concept or one or more examples described above (e.g. FIG. 1-4). The mobile device 150 may comprise one or more additional optional features corresponding to one or more aspects of the proposed concept or one or more examples described above or below.

In some examples, a cell phone may comprise a transmitter or a transceiver comprising an apparatus for generating a transmit signal according to the proposed concept or one or more examples described above or below.

Further, some examples relate to a base station or a relay station of a mobile communication system comprising a transmitter or a transceiver with an apparatus for generating a transmit signal according to the described concept or one or more examples described above or below.

Some examples relate to an apparatus for generating a transmit signal. The apparatus comprises means for generating a radio frequency transmit signal configured to generate a radio frequency transmit signal based on an up-conversion of a first component signal of a complex valued baseband transmit signal with a first oscillator signal and an up-conversion of a delayed second component signal of the complex valued baseband transmit signal with a second oscillator signal. The first oscillator signal and the second oscillator signal comprise an oscillator signal phase offset so that an edge of the second oscillator signal occurs earlier than a corresponding edge of the first oscillator signal. Further, the apparatus comprises means for generating a delay configured to delay a second component signal of the complex valued baseband transmit signal relative to the first component signal of the complex valued baseband transmit signal by a predefined component signal delay to generate the delayed second component signal of the complex valued baseband transmit signal.

The edges of symbol intervals within the first and the second component signal may be adapted to the oscillator signal phase offset by using a proposed delay module. Therefore, disturbing signal portions within the transmit band may be reduced. In this way, the EVM (error vector magnitude) may be improved and/or spectral demands may be met easier.

More details and aspects of the apparatus are mentioned in connection with the proposed concept or one or more examples described above or below (e.g. FIG. 1-5). The apparatus may comprise one or more additional optional features corresponding to one or more aspects of the proposed concept or one or more examples described above or below.

Figure 6:
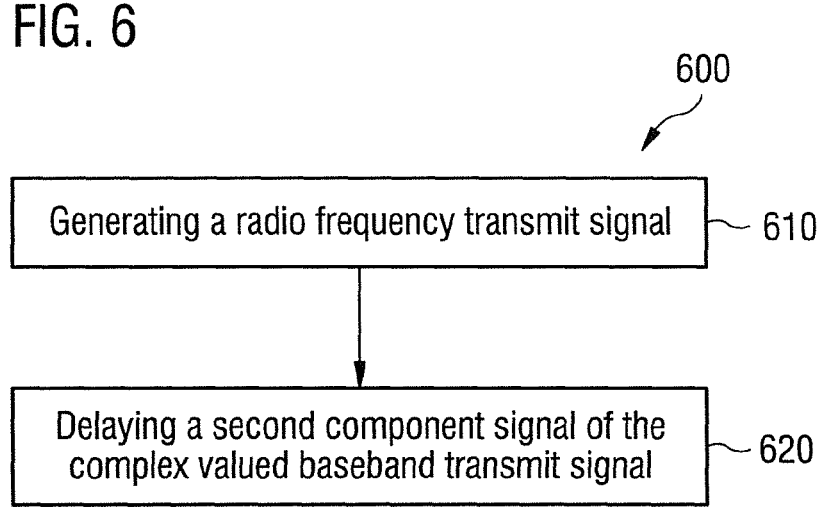
FIG. 6 shows a flow chart of a method for generating a transmit signal.

FIG. 6 shows a flow chart of a method for generating a transmit signal according to an example. The method 600 comprises generating 610 a radio frequency transmit signal based on an up-conversion of a first component signal of a complex valued baseband transmit signal with a first oscillator signal and an up-conversion of a delayed second component signal of the complex valued baseband transmit signal with a second oscillator signal. The first oscillator signal and the second oscillator signal comprise an oscillator signal phase offset so that an edge of the second oscillator signal occurs earlier than a corresponding edge of the first oscillator signal. Further, the method 600 comprises delaying 620 a second component signal of the complex valued baseband transmit signal relative to the first component signal of the complex valued baseband transmit signal by a predefined component signal delay to generate the delayed second component signal of the complex valued baseband transmit signal.

The edges of symbol intervals within the first and the second component signal may be adapted to the oscillator signal phase offset by using a proposed delay module. Therefore, disturbing signal portions within the transmit band may be reduced. In this way, the EVM (error vector magnitude) may be improved and/or spectral demands may be met easier.

More details and aspects of the method 600 are mentioned in connection with the proposed concept or one or more examples described above or below (e.g. FIG. 1-5). The method 600 may comprise one or more additional optional acts corresponding to one or more aspects of the proposed concept or one or more examples described above or below.

Some examples relate to an RFDAC intrinsic IQ cancellation.

An IQ modulator (without implementation of the proposed delay) may have a systematic error called IQ Image, for example. This error can be seen in spectral and EVM measurements. There may be two reasons for this systematic error.

A first reason may be insufficient filtering of aliasing spectra. The spectrum of a digital signal repeats itself with multiple of sampling frequency. In zero order hold (ZOH) digital to analog converter (DAC) one digital signal sample may be converted to a rectangular analog signal, for example. In frequency domain this corresponds to multiplication of digital spectra with sinc—function, for example. Zeros of sinc function fall into aliasing spectra but this kind of filtering may be insufficient as represented in FIG. 7, for example. For example, since RFDAC does not contain digital reconstruction filter (or any filter) before modulation, an aliasing spectral parts that originates from digital signal may be also modulated with LO and transformed in primary bandwidth, making IQ image.

A second reason may be an IQ imbalance. In order to achieve modulation, I and Q signals in RFDAC IQ mode, are multiplied with LO signals that have 90° phase difference. Since rectangular signals are used, 90° phase difference is achieved by shifting one of the LO signals for a quarter of LO time period. After multiplication with LO, signal in Q branch start quarter of period before signal in I. This may lead to IQ imbalance which contributes to IQ image, for example. In such IQ modulators (without implementation of the proposed delay), the amplitudes of I and Q signals are changing together with the changes of the local oscillator signals. Thus, I signal starts a quarter period after Q signal. This may make a systematic error that is visible in spectral and EVM measurements.

It is proposed to delay signal in one of the branches for ¼ LO period. Both reasons for IQ—Image building may be in this case suppressed or reduced.

Signals in both branches may be aligned to avoid systematic error, for example. For this reason signal in Q branch may be delayed for a ¼ LO period. A delay may be implemented by adding fractional delay using a (for example allpass) filter before the RFDAC, by adding delay by multiplying signal with phase shift in the frequency domain (e.g. during LTE processing) after FFT and before IFFT in OFDM signal generation and/or by using a Fractional Sample Rate Converter (FSRC) to generate a delayed oversampled signal, for example.

The proposed concept may be capable to be implemented for each ZOH RFDAC architecture that uses IQ mode, for example.

For example, when using ZOH RFDAC without using the proposed concept IQ image in low band cannot be less than 46 [dB]. In the case where IQ image is lower than 46 [dB] the proposed concept may be used (e.g. either allpass filter, phase multiplication in baseband or similar implementation). For example, when using FOH (first order hold) RFDAC or higher orders interpolators, repeated spectral parts may be filtered out and in that case it may be sufficient to synchronize starting points of I and Q branches. In that case IQ image is not noticeable, for example.

For example, the proposed concept may enable suppressing IQ Image and improving EVM, which originate from systematic error in RFDAC IQ modulator architecture.

Some examples relate to an implementation of the proposed concept in high volume architectures, in computer system architectures features and interfaces made in high volumes, may encompass IA (integrated architectures), devices (e.g. transistors) and associated manufacturing (mfg) processes.

In the following examples pertain to further examples. Example 1 is an apparatus for generating a transmit signal comprising an up-conversion module configured to up-convert a first component signal of a multi-phase baseband transmit signal using a first oscillator signal and up-convert a delayed second component signal of the multi-phase baseband transmit signal using a second oscillator signal to generate a radio frequency transmit signal, wherein the first oscillator signal and the second oscillator signal comprise an oscillator signal phase offset so that an edge of the second oscillator signal occurs earlier than a corresponding edge of the first oscillator signal, and a delay module configured to delay a second component signal of the multi-phase baseband transmit signal relative to the first component signal of the multi-phase baseband transmit signal by a predefined component signal delay to generate the delayed second component signal of the multi-phase baseband transmit signal.

In example 2, the subject matter of example 1 can optionally include the predefined component signal delay being less than a period of the first oscillator signal.

In example 3, the subject matter of example 2 can optionally include the predefined component signal delay being between 10% and 50% of a period of the first oscillator signal.

In example 4, the subject matter of any one of examples 1-3 can optionally include the predefined component signal delay being substantially equal to 25% of a period of the first oscillator signal.

In example 5, the subject matter of any one of examples 1-4 can optionally include the first oscillator signal and the second oscillator signal comprising the same frequency.

In example 6, the subject matter of any one of examples 1-5 can optionally include the oscillator signal phase offset being substantially equal to 90°.

In example 7, the subject matter of any one of examples 1-6 can optionally include a fractional sample rate converter module comprising the delay module, wherein the fractional sample rate converter module is configured to convert a sample rate of the second component signal of the multi-phase baseband transmit signal and delay the second component signal of the multi-phase baseband transmit signal by the predefined component signal delay.

In example 8, the subject matter of any one of examples 1-7 can optionally include the delay module comprising a filter circuit configured to delay the second component signal of the multi-phase baseband transmit signal by the predefined component signal delay.

In example 9, the subject matter of example 8 can optionally include the filter circuit being an all-pass filter circuit.

In example 10, the subject matter of any one of examples 1-9 can optionally include a Fourier Transformation module comprising the delay module, wherein the delay module is configured to generate a phase shift of the second component signal in the frequency domain to generate the predefined component signal delay of the delayed second component signal of the multi-phase baseband transmit signal.

In example 11, the subject matter of one of the previous examples can optionally include a baseband processor module configured to provide the first component signal of the multi-phase baseband transmit signal and the second component signal of the multi-phase baseband transmit signal.

In example 12, the subject matter of one of the previous examples can optionally include the first component signal of the multi-phase baseband transmit signal being an in-phase signal or a quadrature signal and the second component signal of the multi-phase baseband transmit signal being the corresponding quadrature signal or in-phase signal.

In example 13, the subject matter of any of the previous examples can optionally include the up-conversion module comprising a first digital to analog converter configured to convert the first component signal of the multi-phase baseband transmit signal to a first component signal of a multi-phase radio frequency transmit signal with a sampling frequency equal to a frequency of the first oscillator signal, wherein the up-conversion module comprises a second digital to analog converter configured to convert the delayed second component signal of the multi-phase baseband transmit signal to a second component signal of the multi-phase radio frequency transmit signal with a sampling frequency equal to a frequency of the second oscillator signal.

In example 14, the subject matter of example 13 can optionally including the up-conversion module being configured to combine the first component signal of the multi-phase radio frequency transmit signal and the second component signal of the multi-phase radio frequency transmit signal to generate the radio frequency transmit signal.

In example 15, the subject matter of any one of examples 13-14 can optionally include the first digital to analog converter and the second digital to analog converter being zero-order-hold digital to analog converters.

In example 16, the subject matter of any one of examples 1-15 can optionally include an oscillator module configured to generate the first oscillator signal and the second oscillator signal.

In example 17, the subject matter of example 16 can optionally include the oscillator module being configured to generate the first oscillator signal and the second oscillator signal with a first oscillator signal frequency during a first transmission time interval, wherein the oscillator module is configured to generate the first oscillator signal and the second oscillator signal with a second oscillator signal frequency during a succeeding second transmission time interval, wherein the first oscillator signal frequency differs from the second oscillator signal frequency.

In example 18, the subject matter of any one of examples 1-17 can optionally include the delay module being configured to delay the second component signal of the multi-phase baseband transmit signal relative to the first component signal of the multi-phase baseband transmit signal by different predefined component signal delays for different oscillator signal frequencies of the second oscillator signal.

In example 19, the subject matter of any one of examples 1-18 can optionally include the up-conversion module and the delay module being implemented on a common semiconductor die.

Example 20 is an apparatus for generating a transmit signal comprising means for generating a radio frequency transmit signal configured to generate a radio frequency transmit signal based on an up-conversion of a first component signal of a multi-phase baseband transmit signal with a first oscillator signal and an up-conversion of a delayed second component signal of the multi-phase baseband transmit signal with a second oscillator signal, wherein the first oscillator signal and the second oscillator signal comprise an oscillator signal phase offset so that an edge of the second oscillator signal occurs earlier than a corresponding edge of the first oscillator signal, and means for generating a delay configured to delay a second component signal of the multi-phase baseband transmit signal relative to the first component signal of the multi-phase baseband transmit signal by a predefined component signal delay to generate the delayed second component signal of the multi-phase baseband transmit signal.

In example 21, the subject matter of example 20 can optionally include the predefined component signal delay being substantially equal to 25% of a period of the first oscillator signal.

Example 22 is a transmitter or a transceiver comprising an apparatus according the subject matter of any of the previous examples.

Example 23 is a mobile device comprising a transmitter or a transceiver according to example 22.

Example 24 is a cell phone comprising a transmitter or a transceiver according to example 22.

Example 25 is a method for generating a transmit signal comprising generating a radio frequency transmit signal based on an up-conversion of a first component signal of a multi-phase baseband transmit signal with a first oscillator signal and an up-conversion of a delayed second component signal of the multi-phase baseband transmit signal with a second oscillator signal, wherein the first oscillator signal and the second oscillator signal comprise an oscillator signal phase offset so that an edge of the second oscillator signal occurs earlier than a corresponding edge of the first oscillator signal, and delaying a second component signal of the multi-phase baseband transmit signal relative to the first component signal of the multi-phase baseband transmit signal by a predefined component signal delay to generate the delayed second component signal of the multi-phase baseband transmit signal.

In example 26, the subject matter of example 25 can optionally include the predefined component signal delay being between 10% and 50% of a period of the first oscillator signal.

In example 27, the subject matter of example 25 or 26 can optionally include the predefined component signal delay being substantially equal to 25% of a period of the first oscillator signal.

In example 28, the subject matter of one of the examples 25 to 28 can optionally include the first oscillator signal and the second oscillator signal comprising the same frequency.

In example 29, the subject matter of one of the examples 25 to 28 can optionally include the oscillator signal phase offset being substantially equal to 90°.

In example 30, the subject matter of one of the examples 25 to 29 can optionally include the first component signal of the multi-phase baseband transmit signal being an in-phase signal or a quadrature signal and the second component signal of the multi-phase baseband transmit signal being the corresponding quadrature signal or in-phase signal.

In example 31, the subject matter of one of the examples 25 to 30 can optionally include generating the first oscillator signal and the second oscillator signal with a first oscillator signal frequency during a first transmission time interval and generating the first oscillator signal and the second oscillator signal with a second oscillator signal frequency during a succeeding second transmission time interval, wherein the first oscillator signal frequency differs from the second oscillator signal frequency.

In example 32, the subject matter of one of the examples 28 to 32 can optionally include the second component signal of the multi-phase baseband transmit signal being delayed relative to the first component signal of the multi-phase baseband transmit signal by different predefined component signal delays for different oscillator signal frequencies of the second oscillator signal.

Example 33 is a machine readable storage medium including program code, when executed, to cause a machine to perform the method of one of the examples 25 to 32.

Example 34 is a machine readable storage including machine readable instructions, when executed, to implement a method or realize an apparatus as implemented by any one of examples 1-32.

Example 35 is a computer program having a program code for performing the method of one of the examples 25 to 32, when the computer program is executed on a computer or processor.

Examples may further provide a computer program having a program code for performing one of the above methods, when the computer program is executed on a computer or processor. A person of skill in the art would readily recognize that steps of various above-described methods may be performed by programmed computers. Herein, some examples are also intended to cover program storage devices, e.g., digital data storage media, which are machine or computer readable and encode machine-executable or computer-executable programs of instructions, wherein the instructions perform some or all of the acts of the above-described methods. The program storage devices may be, e.g., digital memories, magnetic storage media such as magnetic disks and magnetic tapes, hard drives, or optically readable digital data storage media. The examples are also intended to cover computers programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and examples of the disclosure, as well as specific examples thereof, are intended to encompass equivalents thereof.

Functional blocks denoted as "means for . . . " (performing a certain function) shall be understood as functional blocks comprising circuitry that is configured to perform a certain function, respectively. Hence, a "means for s.th." may as well be understood as a "means configured to or suited for s.th.". A means configured to perform a certain function does, hence, not imply that such means necessarily is performing the function (at a given time instant).

Functions of various elements shown in the figures, including any functional blocks labeled as "means", "means for providing a sensor signal", "means for generating a transmit signal.", etc., may be provided through the use of dedicated hardware, such as "a signal provider", "a signal processing unit", "a processor", "a controller", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some examples a single act may include or may be broken into multiple sub acts. Such sub acts may be included and part of the disclosure of this single act unless explicitly excluded.

What is claimed is:

1. An apparatus for generating a transmit signal comprising:
   an up-conversion circuit configured to up-convert a first component signal of a multi-phase baseband transmit signal using a first oscillator signal and up-convert a delayed second component signal of the multi-phase baseband transmit signal using a second oscillator signal to generate a radio frequency transmit signal, wherein the first oscillator signal and the second oscillator signal comprise an oscillator signal phase offset and wherein an edge of the second oscillator signal occurs earlier than a corresponding edge of the first oscillator signal; and
   a delay circuit configured to delay a second component signal of the multi-phase baseband transmit signal relative to the first component signal of the multi-phase baseband transmit signal by a predefined component signal delay to generate the delayed second component signal of the multi-phase baseband transmit signal, wherein an edge of the delayed second component signal occurs later than a corresponding edge of the first component signal, and
   wherein the predefined component signal delay is less than a period of the first oscillator signal.

2. The apparatus according to claim 1, wherein the predefined component signal delay is between about 10% and about 50% of a period of the first oscillator signal.

3. The apparatus according to claim 1, wherein the predefined component signal delay is substantially equal to about 25% of a period of the first oscillator signal.

4. The apparatus according to claim 1, wherein the first oscillator signal and the second oscillator signal comprise the same frequency.

5. The apparatus according to claim 1, wherein the oscillator signal phase offset is substantially equal to about 90°.

6. The apparatus according to claim 1, comprising a fractional sample rate converter circuit comprising the delay circuit, wherein the fractional sample rate converter circuit is configured to convert a sample rate of the second component signal of the multi-phase baseband transmit signal and delay the second component signal of the multi-phase baseband transmit signal by the predefined component signal delay.

7. The apparatus according to claim 1, wherein the delay circuit comprises a filter circuit configured to delay the second component signal of the multi-phase baseband transmit signal by the predefined component signal delay.

8. The apparatus according to claim 7, wherein the filter circuit is an all-pass filter circuit.

9. The apparatus according to claim 1, comprising a Fourier Transformation circuit comprising the delay circuit, wherein the delay circuit is configured to generate a phase shift of the second component signal in the frequency domain to generate the predefined component signal delay of the delayed second component signal of the multi-phase baseband transmit signal.

10. The apparatus according to claim 1, further comprising a baseband processor circuit configured to provide the first component signal of the multi-phase baseband transmit signal and the second component signal of the multi-phase baseband transmit signal.

11. The apparatus according to claim 1, wherein the first component signal of the multi-phase baseband transmit signal is an in-phase signal or a quadrature signal and the second component signal of the multi-phase baseband transmit signal is the corresponding quadrature signal or in-phase signal.

12. The apparatus according to claim 10, wherein the up-conversion circuit comprises a first digital to analog converter configured to convert the first component signal of the multi-phase baseband transmit signal to a first component signal of a multi-phase radio frequency transmit signal with a sampling frequency equal to a frequency of the first oscillator signal, wherein the up-conversion circuit comprises a second digital to analog converter configured to convert the delayed second component signal of the multi-phase baseband transmit signal to a second component signal of the multi-phase radio frequency transmit signal with a sampling frequency equal to a frequency of the second oscillator signal.

13. The apparatus according to claim 12, wherein the up-conversion circuit is configured to combine the first component signal of the multi-phase radio frequency transmit signal and the second component signal of the multi-phase radio frequency transmit signal to generate the radio frequency transmit signal.

14. The apparatus according to claim 12, wherein the first digital to analog converter and the second digital to analog converter are zero-order-hold digital to analog converters.

15. The apparatus according to claim 1, further comprising an oscillator circuit configured to generate the first oscillator signal and the second oscillator signal.

16. The apparatus according to claim 15, wherein the oscillator circuit is configured to generate the first oscillator signal and the second oscillator signal with a first oscillator signal frequency during a first transmission time interval, wherein the oscillator circuit is configured to generate the first oscillator signal and the second oscillator signal with a second oscillator signal frequency during a succeeding second transmission time interval, wherein the first oscillator signal frequency differs from the second oscillator signal frequency.

17. An apparatus for generating a transmit signal comprising:
an up-conversion circuit configured to up-convert a first component signal of a multi-phase baseband transmit signal using a first oscillator signal and up-convert a delayed second component signal of the multi-phase baseband transmit signal using a second oscillator signal to generate a radio frequency transmit signal, wherein the first oscillator signal and the second oscillator signal comprise an oscillator signal phase offset and wherein an edge of the second oscillator signal occurs earlier than a corresponding edge of the first oscillator signal; and
a delay circuit configured to delay a second component signal of the multi-phase baseband transmit signal relative to the first component signal of the multi-phase baseband transmit signal by a predefined component signal delay to generate the delayed second component signal of the multi-phase baseband transmit signal,
wherein the delay circuit is configured to delay the second component signal of the multi-phase baseband transmit signal relative to the first component signal of the multi-phase baseband transmit signal by different predefined component signal delays for different oscillator signal frequencies of the second oscillator signal.

18. The apparatus according to claim 1, wherein the up-conversion circuit and the delay circuit are implemented on a common semiconductor die.

19. A transmitter or a transceiver comprising an apparatus according to claim 1.

20. A method for generating a transmit signal comprising:
generating a radio frequency transmit signal based on an up-conversion of a first component signal of a multi-phase baseband transmit signal with a first oscillator signal and an up-conversion of a delayed second component signal of the multi-phase baseband transmit signal with a second oscillator signal, wherein the first oscillator signal and the second oscillator signal comprise an oscillator signal phase offset and wherein an edge of the second oscillator signal occurs earlier than a corresponding edge of the first oscillator signal; and
delaying a second component signal of the multi-phase baseband transmit signal relative to the first component signal of the multi-phase baseband transmit signal by a predefined component signal delay to generate the delayed second component signal of the multi-phase baseband transmit signal, wherein an edge of the delayed second component signal occurs later than a corresponding edge of the first component signal, and
wherein the predefined component signal delay is less than a period of the first oscillator signal.

21. The method according to claim 20, wherein the predefined component signal delay is between about 10% and about 50% of a period of the first oscillator signal.

22. The method according to claim 20, wherein the predefined component signal delay is substantially equal to about 25% of a period of the first oscillator signal.

* * * * *